(No Model.) 2 Sheets—Sheet 1.

N. H. & J. H. BLOOM.
RUNNING GEAR FOR VEHICLES.

No. 382,406. Patented May 8, 1888.

Witnesses.
M. E. Fowler
E. G. Siggers

Inventors.
Nicholas H. Bloom, and
Joseph H. Bloom,
by C. A. Snow & Co.
their Attorneys.

(No Model.) 2 Sheets—Sheet 2.

N. H. & J. H. BLOOM.
RUNNING GEAR FOR VEHICLES.

No. 382,406. Patented May 8, 1888.

Witnesses.
M Fowler.
E. G. Siggers.

Inventors
Nicklas H. Bloom and
Joseph H. Bloom
by C. A. Snow & Co.
their Attorneys N. PETERS, Photo-Lithographer, Washington, D. C.

UNITED STATES PATENT OFFICE.

NICKLAS H. BLOOM AND JOSEPH H. BLOOM, OF CHARLES CITY, IOWA.

RUNNING-GEAR FOR VEHICLES.

SPECIFICATION forming part of Letters Patent No. 382,406, dated May 8, 1888.

Application filed September 13, 1887. Serial No. 249,575. (No model.)

To all whom it may concern:

Be it known that we, NICKLAS H. BLOOM and JOSEPH H. BLOOM, citizens of the United States, residing at Charles City, in the county of Floyd and State of Iowa, have invented new and useful Improvements in Running-Gears, of which the following is a specification.

Our invention has reference to running-gear for vehicles; and our invention has for its object to simplify and lighten the gear and at the same time add to its strength and durability.

Figure 1:
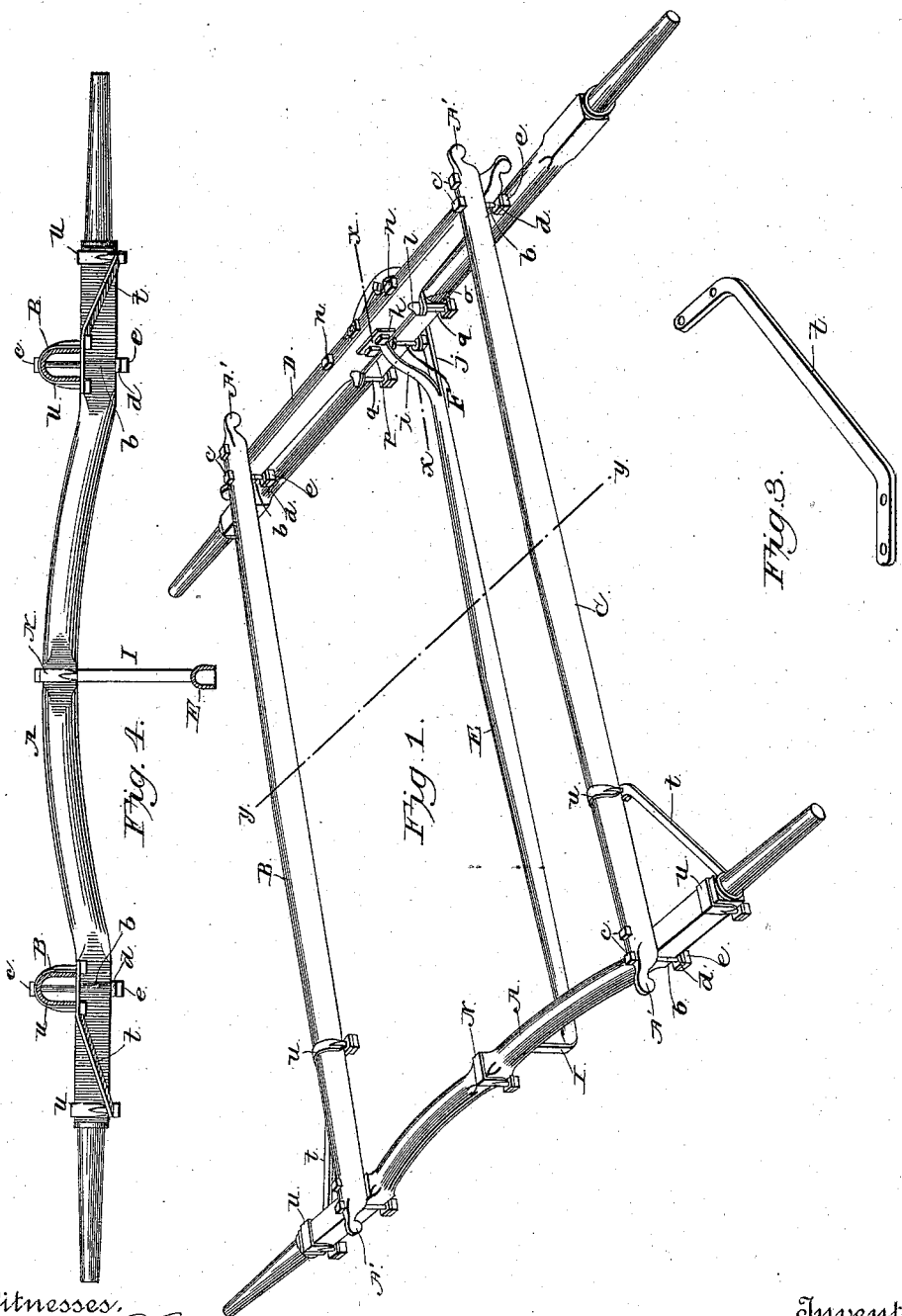
Figure 2:
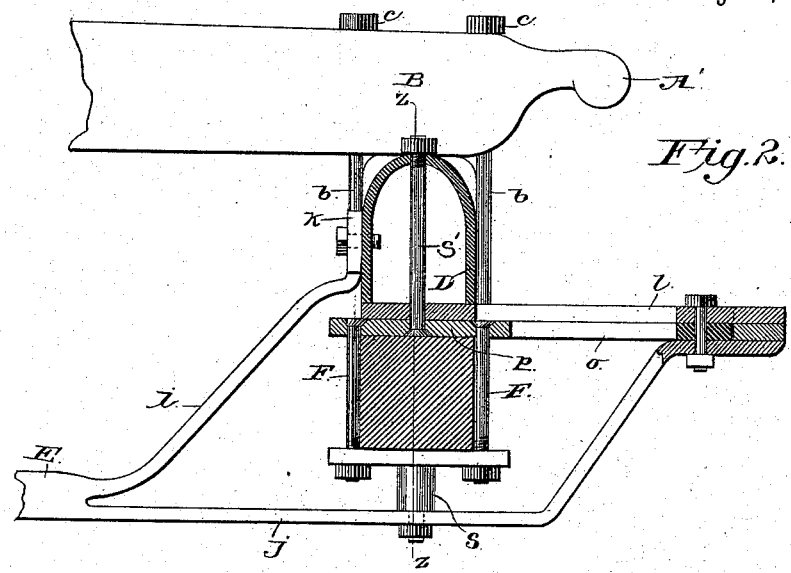
Figure 7:
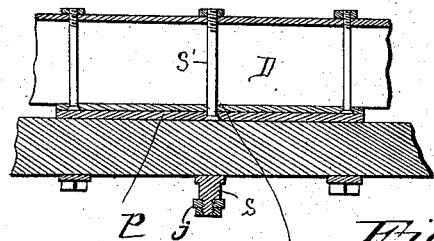
Figure 5:
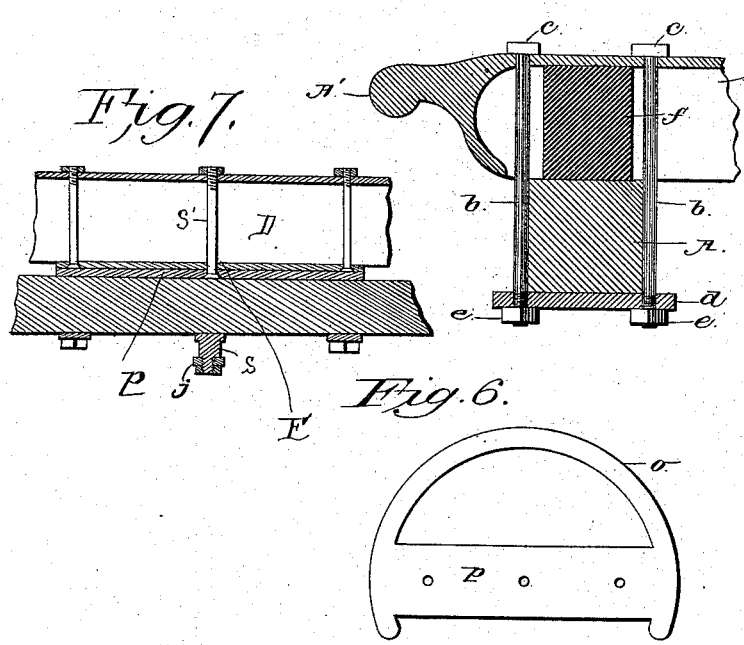
Figure 6:
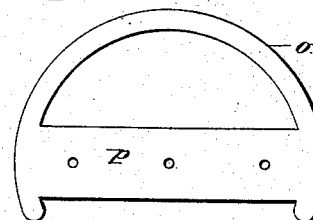

In the accompanying drawings, forming part of this specification, Figure 1 is a perspective view of a running-gear constructed in accordance with our invention. Fig. 2 is a section of the gear on the line $x\ x$ of Fig. 1. Fig. 3 is a perspective view of one of the rear braces. Fig. 4 is a transverse section on line $y\ y$ of Fig. 1. Fig. 5 is a detail sectional view. Fig. 6 is a detail view. Fig. 7 is a detail sectional view on the line $z\ z$ of Fig. 2.

A refers to the rear axle, to which are rigidly connected the side bars, B C. The front bar, D, is also rigidly connected to the side bars, as hereinafter explained. Each of the side bars, B C, is made of steel and is of an inverted-U shape, except at its ends, where it terminates in the tongues A', which are designed to confer strength as well as constitute an ornament for the gearing. The side bars, B C, are secured at their front to the front bar, D, which is similar in construction to the said side bars, but necessarily of shorter length.

It will be seen that the side bars rest upon the rear axle and front bar, and connections are established by means of vertical bolts $b$, which extend through perforations in the side bars, so that their heads $c$ will bear upon the upper face of said bars, the lower threaded ends of said bolts passing through openings in tie-plates $d$, arranged transversely beneath the rear axle and front bar, and nuts $e$, engaging the lower ends of said bolts, and hold the connection rigid. Within the recess of each side bar and between the bolts $b$ is located a block or cushion, $f$, of rubber, which prevents the parts from rattling.

E designates the reach, which is of smaller diameter than the side bars, but consists of steel bent in an inverted-U form. The rear portion, I, of said reach is formed into an arm, which is bent vertically and then horizontally, so as to bear against the under side of the center of the rear axle. A clip-bolt, N, embraces said axle and has its threaded ends passed through perforations in the horizontal portion of the arm. The front part of the reach is formed into two arms, $i\ j$, one above the other, the upper arm, $i$, being curved, as shown, and terminating in a transverse plate, $k$, which is bolted to the rear of the front bar. The lower arm, $j$, extends under the front axle and extends up forwardly and horizontally, when it is secured to the center of a curved segment, $l$, forming the upper section of the fifth-wheel of the gearing. The ends of this segment are secured to the front bar by means of bolts $n$.

The lower segment of the fifth-wheel is constituted by a plate, $o$, whose ends are connected by an integral plate, P, which bears upon the upper edge of the central part of the front axle. Clip-bolts $q$ pass down from said plate P through the tie-bar, where they are secured by nuts.

The central clip, F, of the front axle carries upon its upper and lower side a short bolt-section, $s\ s'$, the end of each of which is threaded. The lower bolt-section, $s$, passes through a perforation of the lower arm, $j$, and carries a nut on its end to prevent disengagement. The upper bolt-section passes through the front bar and is attached thereto by a nut. It will thus be seen that the bolt-sections $s\ s'$ act as a king-bolt for the gearing. At the rear of the gearing braces $t$ are located, each of which consists of an iron bar bent as indicated, and each having its ends arranged to bear under the adjacent side bar and rear axle. Yoke-clips $u$ pass, respectively, over the rear axle and side bar and are threaded to engage the braces.

From the foregoing it will be seen that the gearing herein described is not only light of weight, but of light appearance. The general construction is strengthened and simplified, while the splitting of the bars, so incident to cases where wood is employed, is avoided.

We claim—

1. The combination, with the rear axle and front bar, of the recessed side bars connected at their ends to said rear axle and front bar, and yielding cushions located in said recessed side bars at the points of connection to the rear axle and front bar, substantially as described.

2. The combination of the rear axle and front bar, the side bars, the bolts passing through the side bars to secure them to the rear axle and front bar, and the rubber cushions $f$ between the said bolts, substantially as specified.

3. The improved reach herein described, consisting of a metal section of inverted-U shape and having integral vertical arms at its ends, substantially as described.

4. The combination, with the rear and front axles and front and side bars, of the hollow reach connected to the rear axle and having arms $i\ j$ at its front end connected to the front bar and axle, substantially as described.

5. The combination, with the rear and front axles and side and front bars, of the fifth-wheel consisting of the upper and lower segmental plates, the latter having plate P bolted to the front axle, and a clip secured to said front axle and having bolts $s\ s'$, forming the king-bolt, substantially as described.

6. The combination, with the rear axle, of the side bars bolted to the top side thereof, and yielding cushions between the axle and side bars at the point of intersection, as set forth.

7. In a running-gear, a hollow reach having its front end extended past the front axle and upward in front thereof to form a support for the fifth-wheel, as set forth.

8. In a running-gear, a reach provided at its front end with integral diverging arms, one of said arms forming a support for the fifth-wheel and the other being adapted to be secured to the front bar of the gear, as set forth.

In testimony that we claim the foregoing as our own we have hereto affixed our signatures in presence of two witnesses.

NICKLAS H. BLOOM.
    JOSEPH H. BLOOM.

Witnesses:
 H. D. WHITE,
 W. W. DENNIS.